(12) United States Patent
Drucker et al.

(10) Patent No.: US 8,595,153 B2
(45) Date of Patent: Nov. 26, 2013

(54) EXPLORING DATA USING MULTIPLE MACHINE-LEARNING MODELS

(75) Inventors: Steven Mark Drucker, Bellevue, WA (US); Kayur Dushyant Patel, Seattle, WA (US); Desney S. Tan, Kirkland, WA (US); Ashish Kapoor, Kirkland, WA (US); James Anthony Fogarty, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 413 days.

(21) Appl. No.: 12/797,395

(22) Filed: Jun. 9, 2010

(65) Prior Publication Data

US 2011/0307422 A1    Dec. 15, 2011

(51) Int. Cl.
*G06N 5/00* (2006.01)
(52) U.S. Cl.
USPC .............................................. 706/12; 706/45
(58) Field of Classification Search
USPC .................................................... 706/12, 45
See application file for complete search history.

(56) References Cited

U.S. PATENT DOCUMENTS

| 7,333,965 B2 | 2/2008 | Tilford |
| 2006/0062451 A1 | 3/2006 | Li |
| 2009/0171871 A1 | 7/2009 | Zhang |

OTHER PUBLICATIONS

Zhu, Semi-Supervised Learning with Graphs, Doctoral Thesis, CMU-LTI-05-192, Carnegie Mellon University, 2005, pp. 1-174.*
Gayar, An Experimental Study of a Self-Supervised Classifier Ensemble, International Journal of Information Technology, vol. 1 No. 1, 2004, pp. 19-23.*
Kittler, J., M. Hatef, R. P.W. Duin, J. Matas, On combining classifiers, IEEE Transactions on Pattern Analysis and Machine Intelligence, Mar. 1998, vol. 20, No. 3.
Li, W., J. Han, J. Pei, CMAR: Accurate and efficient classification based on multiple class-association rules, Proc. of the 2001 IEEE Int'l Conf. on Data Mining, ICDM 2001, Nov. 29-Dec. 2, 2001, pp. 369-376, San Jose, California, USA.
Lang, K., NewsWeeder: Learning to filter netnews, Proc. of the Twelfth Int'l Conf. on Machine Learning, ICML 1995, Jul. 9-12, 1995, pp. 331-339, Tahoe City, California, USA.
Lecun, Y., L. Bottou, Y. Bengio, P. Haffner, Gradient-based learning applied to document recognition, Proc. of the IEEE, Nov. 1998, pp. 2278-2324, vol. 86, No. 11.
Nilsback, M.-E., A. Zisserman, A visual vocabulary for flower classification, 2006 IEEE Comp. Society Conf. on Comp. Vision and Pattern Recognition, CVPR 2006, Jun. 17-22, 2006, pp. 1447-1454, New York, NY, USA.
Oliver, N., E. Horvitz, A. Garg, Layered representations for human activity recognition, 4th IEEE Int'l Conf. on Multimodal Interfaces, ICMI 2002, Oct. 14-16, 2002, pp. 3-8, Pittsburgh, PA, USA.

(Continued)

*Primary Examiner* — Wilbert L Starks

(57) ABSTRACT

A multiple model data exploration system and method for running multiple machine-learning models simultaneously to understand and explore data. Embodiments of the system and method allow a user to gain a greater understanding of the data and to gain new insights into their data. Embodiments of the system and method also allow a user to interactively explore the problem and to navigate different views of data. Many different classifier training and evaluation experiments are run simultaneously and results are obtained. The results are aggregated and visualized across each of the experiments to determine and understand how each example is classified for each different classifier. These results then are summarized in a variety of ways to allow users to obtain a greater understanding of the data both in terms of the individual examples themselves and features associated with the data.

20 Claims, 10 Drawing Sheets

(56) References Cited

OTHER PUBLICATIONS

Patel, K., J. Fogarty, J. A. Landay, B. L. Harrison, Investigating statistical machine learning as a tool for software development, CHI 2008, Proc. of the 2008 Conf. on Human Factors in Computing Systems, CHI 2008, Apr. 5-10, 2008, pp. 667-676, Florence, Italy.

Raghavan, H., O. Madani, R. Jones, InterActive feature selection, Proc. of the Nineteenth Int'l Joint Conf. on Artificial Intelligence, IJCAI 2005, pp. 841-846, Jul. 30-Aug. 5, 2005, Edinburgh, Scotland, UK.

Schapire, R. E., The boosting approach to machine learning: An overview, Nonlinear estimation and classification, Dec. 19, 2001, pp. 149-171, Springer, New York.

Stefanowski, J., An experimental study of methods combining multiple classifiers—Diversified both by feature selection and bootstrap sampling, Issues in the Representation and Processing of Uncertain and Imprecise Information. Akademicka Oficyna Wydawnicza Exit, Warszawa, 2005, pp. 337-354.

Talbot, J., B. Lee, A. Kapoor, D. S. Tan, EnsembleMatrix: Interactive visualization to support machine learning with multiple classifiers, Proc. of the 27th Int'l Conf. on Human Factors in Computing Systems, CHI 2009, Apr. 4-9, 2009, pp. 1283-1292, Boston, MA, USA.

Wang, J., B. Yu, L. Gasser, Classification visualization with shaded similarity matrix, Technical Report, GSLIS University of Illinois at Urbana-Champaign, 2002.

\* cited by examiner

EXPLORING DATA USING MULTIPLE MACHINE-LEARNING MODELS

BACKGROUND

Much of the machine learning (ML) research has focused on building more accurate or more efficient models. This research usually accesses the utility of a model based on the performance of the model. The quality of a model depends on several factors, including the correctness or trustworthiness of the training corpus, the discriminative value of the encoded features, and whether additional features or attributes can be encoded that further improve predictive performance. A model that has been trained using mislabeled data or data that has been encoded with non-descriptive features cannot be expected to be accurate. Automatically determining the characteristics of the data can be exceptionally difficult. However, with proper views on the data, human interaction based on domain knowledge and higher order reasoning can be used to interpret results and to build higher-quality models.

Studies have shown that as a rule ML practitioners have trouble understanding relationships between data, attributes and models. As a result, usually there is usually little guidance on how to improve predictive performance. In fact, studies have shown that when their models do not work ML practitioners often spend an inordinate amount of time optimizing their classification algorithm rather than checking the quality of their data and features.

The use of ensemble methods has become quite popular and there is a large body of work on combining results from multiple models. Simple rules such as majority vote, sum, product, maximum and minimum of classifier outputs have been successfully used and often produce results that are an improvement over a single model. Other useful ensemble techniques include critic-driven models. For example, some techniques automatically generate simple models and combine them to build more accurate ensemble models. However, the majority of the work in this space is aimed at learning ensembles to increase accuracy.

Interactive machine learning systems are built with the viewpoint that humans and machines have complementary strengths. By creating a synergistic relationship between machines and humans, interactive machine learning systems can be used to train higher-quality models. A number of systems have followed this paradigm, but again the primary goal of this line of research has focused directly on generating higher-quality models. However, there may be times when a higher-quality model is not enough and tools that help a user to explore the data and to gain a deeper understanding of the data are useful.

For example, programmers incorporating machine learning algorithms (or models) into their code often like to explore how well the models classify different data and which features might impact the models that are build. Too often, however, programmers vary the parameters for one specific model and do not thoroughly explore the space of algorithms, data, and features. A typical machine learning formulation first extracts features from labeled data and then subsequently splits the labeled data into a training and a testing set. The training set is used to create a model, and the testing set is used to evaluate the model. While there are techniques that combine the results of several classifiers into a single joint classifier, there is little or no work that attempts to combine hundreds of classifiers and visualize the results so that users can interpret the results.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the multiple model data exploration system and method run multiple machine-learning models simultaneously to gain an understanding of and explore data. Embodiments of the system and method allow a user to gain an understanding of the data in terms of what are outliers in the data, what items are consistently confused or mislabeled, and the effect that different features have on classifying the items. In addition, embodiments of the system and method use visualizations of the results of the running the data through the models to allow a user to use their domain knowledge to gain new insights into their data Embodiments of the system and method also allow a user to interactively explore the problem and to navigate different views of data. By running many simultaneous experiments, where data is classified through different models, and results are aggregated and visualized across all the experiments, programmers can gain new insights into their data, existing features, and potential new features. Embodiments of the multiple model data exploration system and method simultaneously run many different classifier training and evaluation experiments. The resulting data then is aggregated to determine and understand how each example is classified for each different classifier. Embodiments of the system and method then summarize these results in a variety of ways which allows users to understand the data both in terms of the individual examples themselves and features associated with the data.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the multiple model data exploration system and method reference is made to the accompanying drawings, which form a part thereof, and in which is shown by way of illustration a specific example whereby embodiments of the multiple model data exploration system and method may be practiced. It is to be understood that other embodiments may be utilized and structural changes may be made without departing from the scope of the claimed subject matter.

I. System Overview

Figure 1:
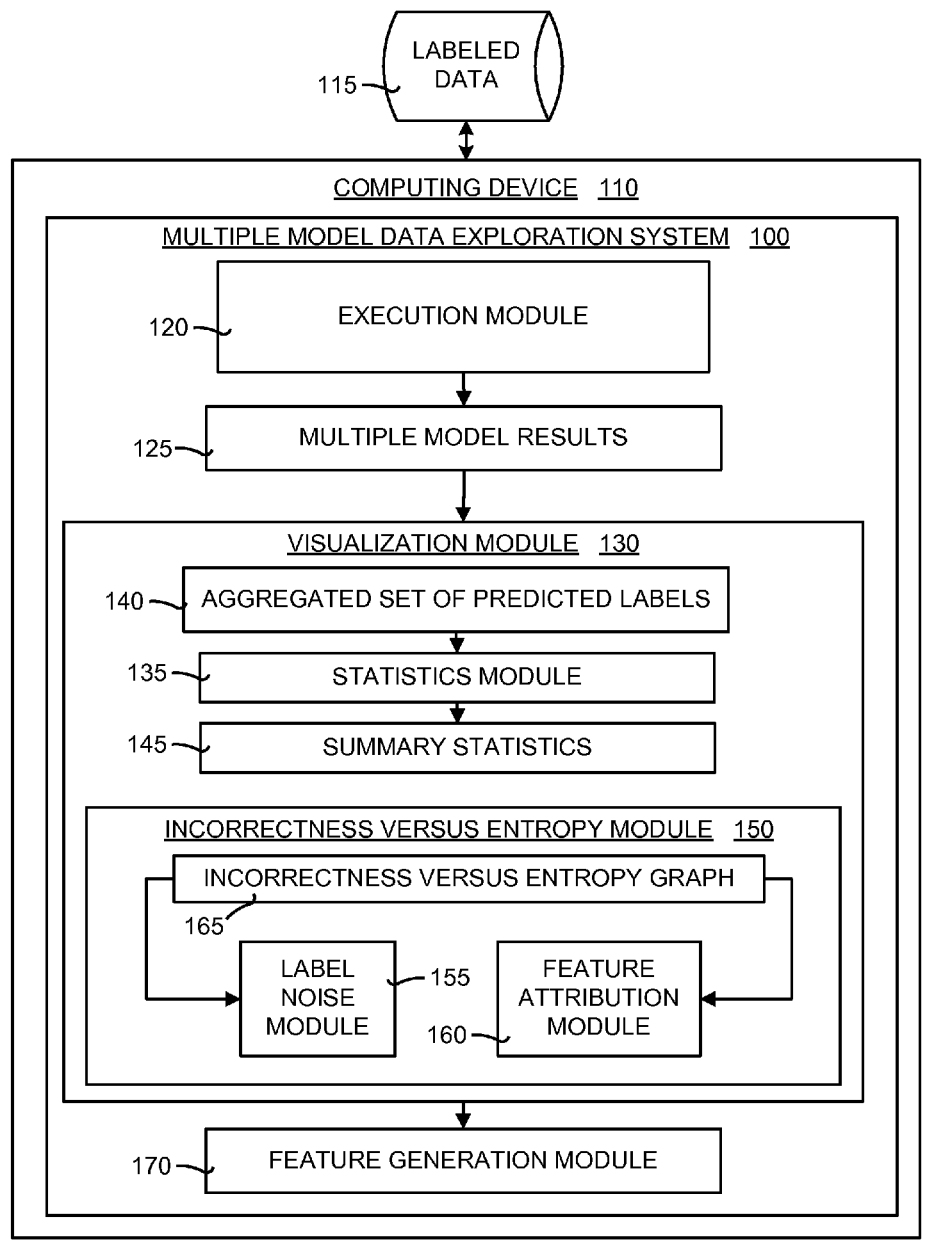
FIG. 1 is a block diagram illustrating a general overview of embodiments of the multiple model data exploration system and method implemented on a computing device.

FIG. 1 is a block diagram illustrating a general overview of embodiments of the multiple model data exploration system 100 and method implemented on a computing device 110. In general, embodiments of the multiple model data exploration system 100 and method input labeled data 115 and then simultaneously run different models and present the results to a user. The user is able to interact with the results to explore and understand the data in terms of what are outlier data, what items are consistently confused or mislabeled, and what effect the different features have on classifying the items.

In particular, embodiments of the multiple model data exploration system 100 and method include an execution module 120. Embodiments of the execution module 120 generate and simultaneously run different models to produce multiple model results 125. These results are used by a visualization module 130 to visualize the results and present them to a user.

Embodiments of the visualization module 130 include a statistics module 135. Input to the statistics module 135 is an aggregated set of predicted labels 140 generated by embodiments of the execution module 120. Embodiments of the statistics module 135 process the aggregated set of predicted labels 140 to obtain summary statistics 145.

Embodiments of the multiple model data exploration system 100 and method also include an incorrectness versus entropy module 150. Embodiments of the module 150 include a label noise module 155 and a feature attribution module 160. Embodiments of the label noise module 155 receive as input an incorrectness versus entropy graph 165 and allow verification of the labels to reduce label noise. Embodiments of the feature attribution module 160 allow a user to change feature attributes based on the visualized results of the incorrectness versus entropy graph 165. A feature generation module 170 is included in embodiments of the multiple model data exploration system 100 and method. Embodiments of the feature generation module 170 facilitate a user exploring different features of the data and updating the features based on the results of the incorrectness versus entropy graph. This exploration includes exploring and understanding the data in terms of what data are outliers, what data are consistently confused, what data are mislabeled, and an effect that different features of the data have on classifying the data.

II. Operational Overview

Figure 2:
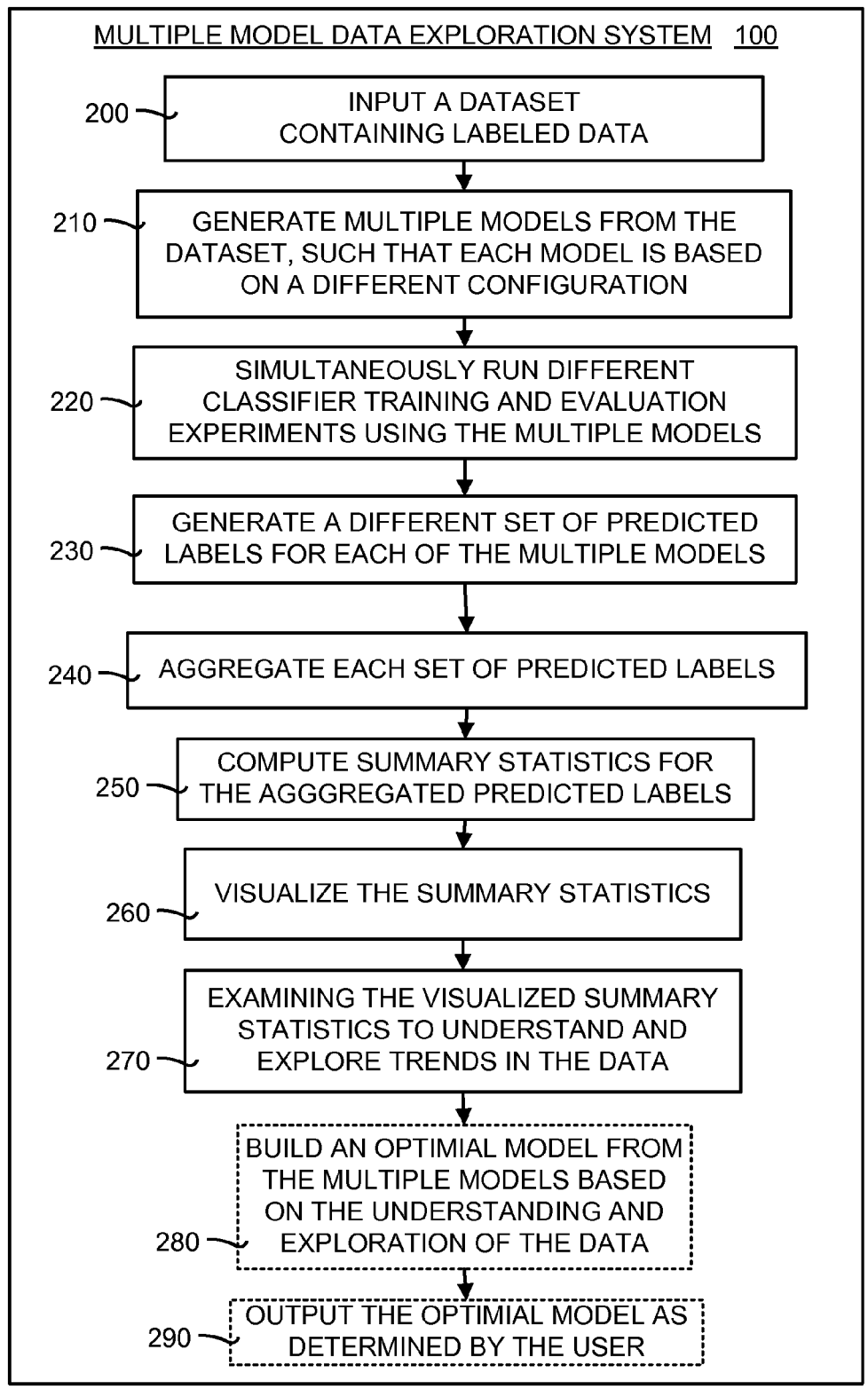
FIG. 2 is a flow diagram illustrating the general operation of embodiments of the multiple model data exploration system shown in FIG. 1.

FIG. 2 is a flow diagram illustrating the general operation of embodiments of the multiple model data exploration system 100 shown in FIG. 1. The operation of embodiments of the system 100 and method begins by inputting a dataset containing labeled data (box 200). Next, multiple models are generated from the dataset (box 210). This generation of multiple models takes place such that each model is based on a different configuration.

Embodiments of the system 100 and method then simultaneously run different classifier training and evaluation experiments using the multiple models (box 220). In some embodiments the multiple models and associated parameters are systematically varied during generation of the multiple models. In some embodiments this systematic variance yields an optimally-differentiated set of results. In other embodiments this systematic variance yields a set of results that matches constraints previously set by a user. A different set of predicted labels then is generated for each of the multiple models (box 230). Embodiments of the system 100 and method then aggregate each set of predicted labels (box 240). From these aggregated labels embodiments of the system 100 and method compute summary statistics (box 250).

The summary statistics then are visualized (box 260). This visualization can use any number of visualization techniques to produce the visualized summary statistics. The user then examines the visualized summary statistics to gain an understanding and to explore the trends in the data (box 270). The next two steps are optional, as shown by the dotted line in FIG. 2. In some embodiments of the system 100 and method an optimal model is built from the multiple models (box 280). This building of the optimal model is based on the user's understanding and exploration of the data. Finally, in some embodiments of the system 100 and method the optimal model as determined by the user is output (box 290).

III. System and Operational Details

Embodiments of the multiple model data exploration system 100 and method includes an execution step and a visualization step. In the execution step, embodiments of the system 100 and method take a dataset and generate multiple models. Each model is based on a different configuration and provides a new set of predicted labels for the data. The visualization step aggregates predicted labels, computes summary statistics, and visualizes the results.

Embodiments of the system 100 and method also include an interactive visualization tool that allows specific visualizations and interactions to help facilitate correcting label noise, linking features and data, and generating insight for new features. The system and the operational details of embodiments of the multiple model data exploration system 100 and method now will be discussed. These embodiments include embodiments of the execution module 120, the statistics module 135, the label noise module 155, the feature attribution module 160, and the feature generation module 170.

III.A. Execution Module

In order to create a model a machine learning practitioner typically parses and segments raw data, compute features, split data into training and testing folds, and selects an algorithm. A single configuration of this process consists of algorithms and parameters for parsing, feature generation, splitting data, and building models. These configurations are modular and interchangeable. For instance, one feature generation technique can be switched out for another or parameters for a classification technique can be changed.

A model provides labels for a portion of the dataset. Because it is generally a good idea to avoid training and testing on the same data, embodiments of the multiple model data exploration system 100 and method train multiple models with different training and testing splits in order to generate predicted labels for the entire dataset. Embodiments of the system 100 and method achieve coverage for the entire dataset by using random cross validation.

In this document, the word "trial" is used to indicate a set of models generated by configurations that differ only in how data is split into testing and training sets. These differences in splits are generated by a cross validation scheme. A trial is essentially a cross validation experiment and as such provides predicted labels for the entire dataset.

Figure 3:
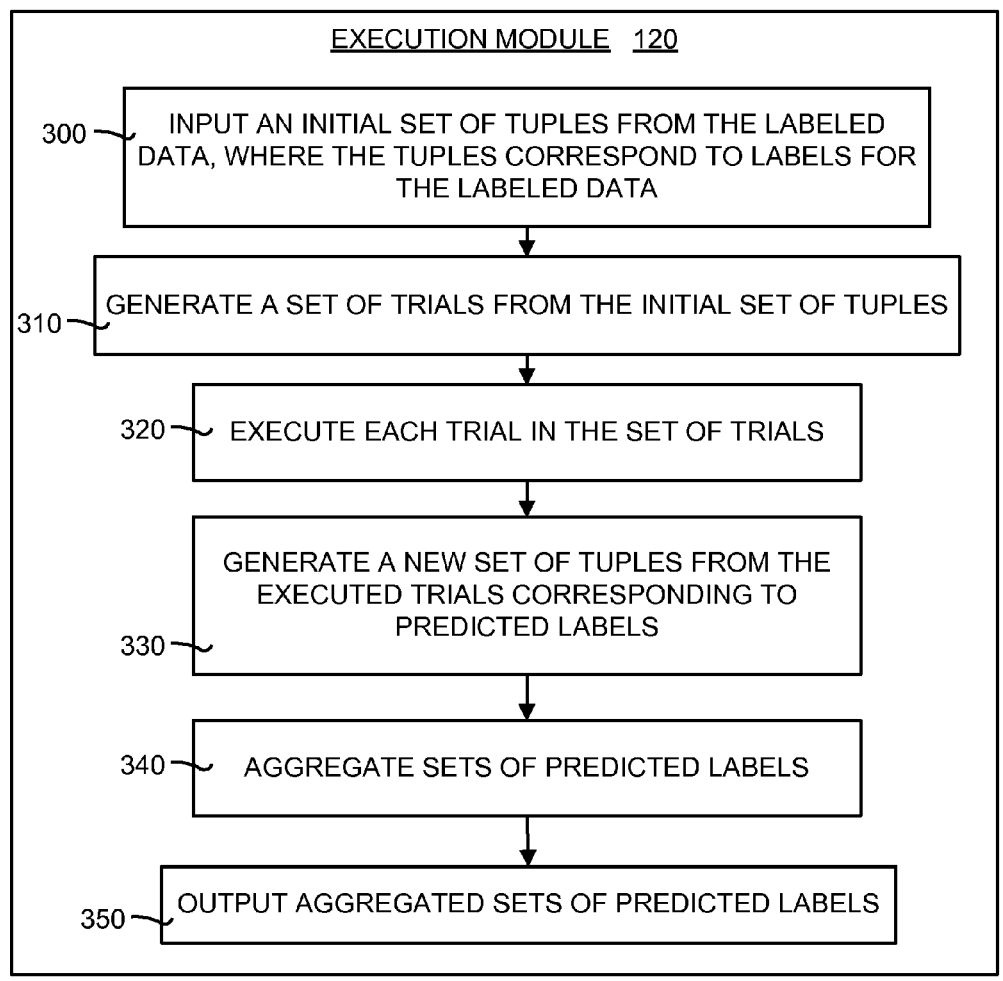
FIG. 3 is a flow diagram illustrating the operational details of embodiments of the execution module shown in FIG. 1.

FIG. 3 is a flow diagram illustrating the operational details of embodiments of the execution module 120 shown in FIG. 1. The method begins by inputting an initial set of tuples from the labeled data (box 300). These tuples correspond to labels for the labeled data. Next, a set of trials are generated from the initial set of tuples (box 310). Each trial in the set of trials that was generated then is executed (box 320).

Embodiments of the execution module 120 then generate a new set of tuples from the executed trials (box 330). This new set of tuples corresponds to predicted labels. In other words, by varying the configurations and generating multiple trials, embodiments of the module 120 generate a set of predicted labels for each example. The intuition is that each configuration will have its own systematic bias, and by using multiple configurations embodiments of the module 120 in effect marginalize the effect of these biases.

Embodiments of the module 120 systematically vary different parameters and algorithms to generate new configurations (such as parameters sweeps over certain parameters for the classification algorithm). The specific algorithms and parameters vary based on the dataset. Next, embodiments of the module 120 aggregate the set of predicted labels (box 340). Finally the aggregated set of predicted labels is output (box 350).

Mathematically, embodiments of the execution module 120 take as input, a set of tuples $(x_i, y_i)$, where x is the $i^{th}$ example from a set of examples X and $y_i$ is the label for that example. Embodiments of module 120 then take these tuples and generate a set of trials. These trials are then executed. This produces a new set of tuples of the form $(x_i, y_i, t_j, \bar{y}_{i,j})$ where $t_j$ is the $j^{th}$ trial from the set of trials T and $\bar{y}_{i,j}$ is the predicted label generated for example $x_i$. Within the $(x_i, y_i, t_j, \bar{y}_{i,j})$ tuples the predicted labels are connections between the examples and the trials.

III.B. Visualization Module

Embodiments of the multiple model data exploration system 100 and method include a visualization module 130 that helps a user explore and interpret the output of the execution phase. Embodiments of the visualization module 130 are built to help explore the interactions between examples and models. Examples provide insight about models and vice versa. Embodiments of the visualization module 130 include specific visualizations and interactions that a user to understand data.

III.B.1. Statistics Module

Embodiments of the visualization module 130 include a statistics module 135 to aid in computing summary statistics. More specifically, embodiments of the statistics module 135 use the tuples computed by embodiments of the execution module 120 to compute summary statistics for examples, sets of examples, trials, and sets of trials. For instance, embodiments of the statistics module 135 compute accuracy of a single trial by examining each of the tuples that include that trial and calculating the percentage of correctly classified tuples. Accuracy computed for one trial can be used to understand the set of trials. For example, to see the distribution of accuracies embodiments of the statistics module 135 can bucket trials into different accuracy ranges to create a histogram of trials and accuracies.

Figure 4:
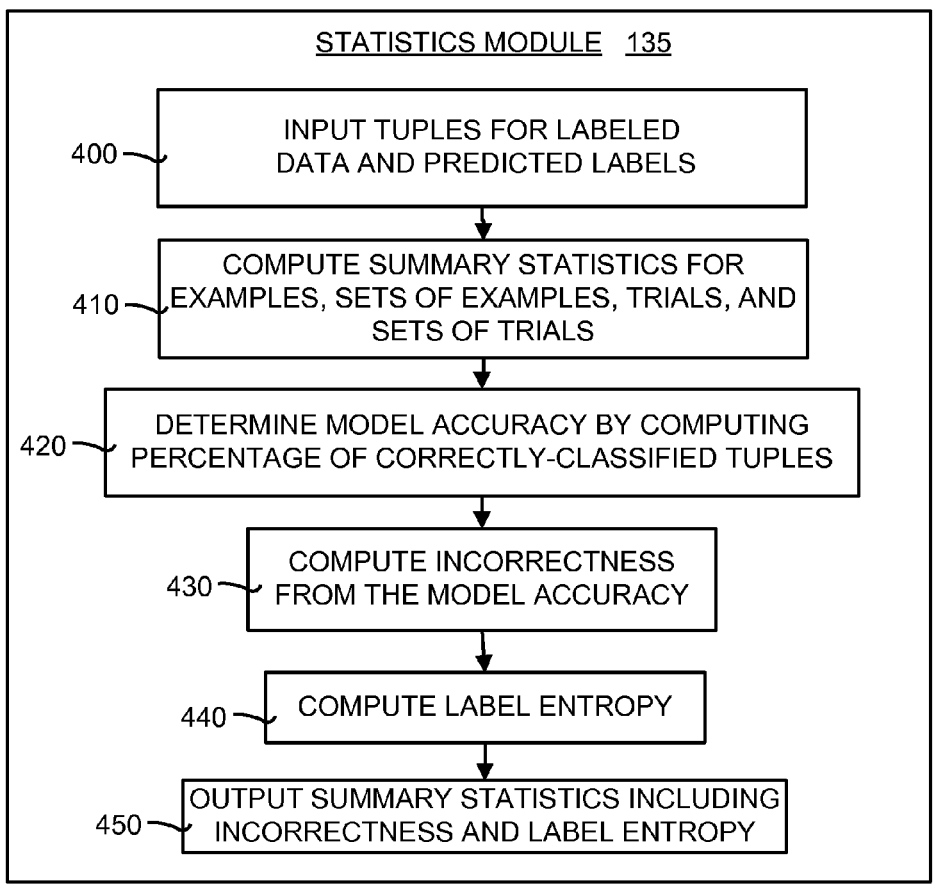
FIG. 4 is a flow diagram illustrating the operational details of embodiments of the statistics module shown in FIG. 1.

FIG. 4 is a flow diagram illustrating the operational details of embodiments of the statistics module 135 shown in FIG. 1. The method begins by inputting the tuples for the labeled data as well as the predicted labels (box 400). Next, embodiments of the module 135 compute summary statistics for examples, sets of examples, trials, and set of trials (box 410). A model accuracy then is determined by computing a percentage of correctly-classified tuples (box 420).

Since machine learning practitioners are often familiar with the data they are seeking to classify, they can leverage their domain knowledge by inspecting the examples. Embodiments of the statistics module 135 can use information generated by trials (such as the predicted label) to compute statistics that provide additional information about the example. Embodiments of the statistics module 135 include two statistics computed over trials: (1) incorrectness; and (2) label entropy.

In particular, embodiments of the statistics module 135 compute an incorrectness from the model accuracy (box 430). Incorrectness is the percentage of trials that incorrectly classified an example. Let 1{z} be the indicator function, which is zero when z is false and one when z is true. Mathematically, incorrectness can be computed as follows, $$inc(x_i) = \sum_{j}^{|T|} \frac{1\{y_i = \bar{y}_{i,j}\}}{|X|}.$$

For multi-class problems it is desirable to see if trials agree on the predicted label for an example. Note that this is different than incorrectness, as trials can agree on the wrong label. It is not only important to know that trials disagree, but it is also important to know how the disagreements vary. For example, in multi-class problems an example may be stable (where it has the same predicted label over all of the trials), or it may be unstable (where trials give a wide range of possible labels). A good measure of stability is the entropy of the distribution of labels. Embodiments of the statistics module 135 compute a label accuracy (box 440). Let L be the set of possible labels. Mathematically, entropy can be computed as follows, $$H(x_i) = -\sum_{l \in L} \frac{\sum_{j}^{|T|} 1\{\bar{y}_{i,j} = l\}}{|T|} \log \frac{\sum_{j}^{|T|} 1\{\bar{y}_{i,j} = l\}}{|T|}.$$

Embodiments of the module 135 then output summary statistics including correctness and label entropy (box 450).

III.B.2. Incorrectness Versus Entropy Module

Figure 5:
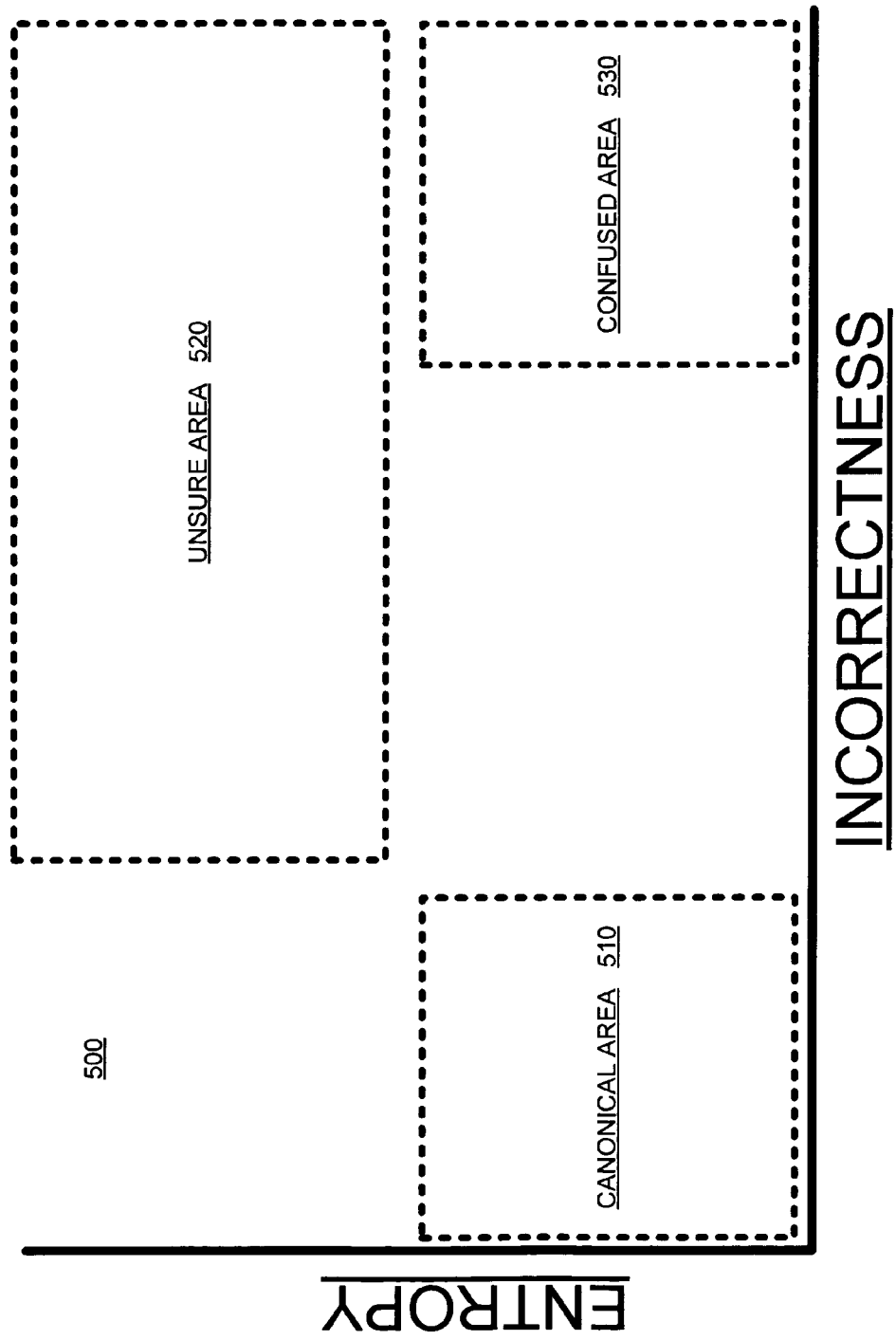
FIG. 5 illustrates an overview of a scatter plot of incorrectness versus entropy illustrating one embodiment of the incorrectness versus entropy module shown in FIG. 1.

Embodiments of the multiple model data exploration system 100 and method include an incorrectness versus entropy module 150 that allows a user to quickly explore a wide variety of visualizations looking at different statistics and how they interact. FIG. 5 illustrates an overview of a scatter plot of incorrectness versus entropy illustrating one embodiment of the incorrectness versus entropy module 150. The embodiment shown in FIG. 5 is one visualization that can help users gain an understanding of the data.

In particular, referring to FIG. 5, an incorrectness versus entropy graph 500 is divided into three areas. Each of the three area corresponds to different types of examples. The three areas are a canonical area 510, an unsure area 520, and a confused area 530. The canonical area 510 contains examples having low entropy and low incorrectness, which means that each of the models agrees on a label and that label is the actual label. In other words, these are the examples that are unambiguously correct.

The unsure area 520 contains examples that have a high entropy. This means that the models cannot agree on the predicted label. This disagreement may stem from deficiencies in the data. For instance, the feature space may not be good enough to disambiguate between examples or the data may be inherently ambiguous.

The confused area 530 contains examples that have low entropy and high incorrectness. This means that these examples are those where the models agree on a predicted label, but that predicted label does not agree with the actual, label. Agreement between trials may indicate an error in the actual label, and therefore confused examples might be a place to look for mislabeled data.

Figure 6:
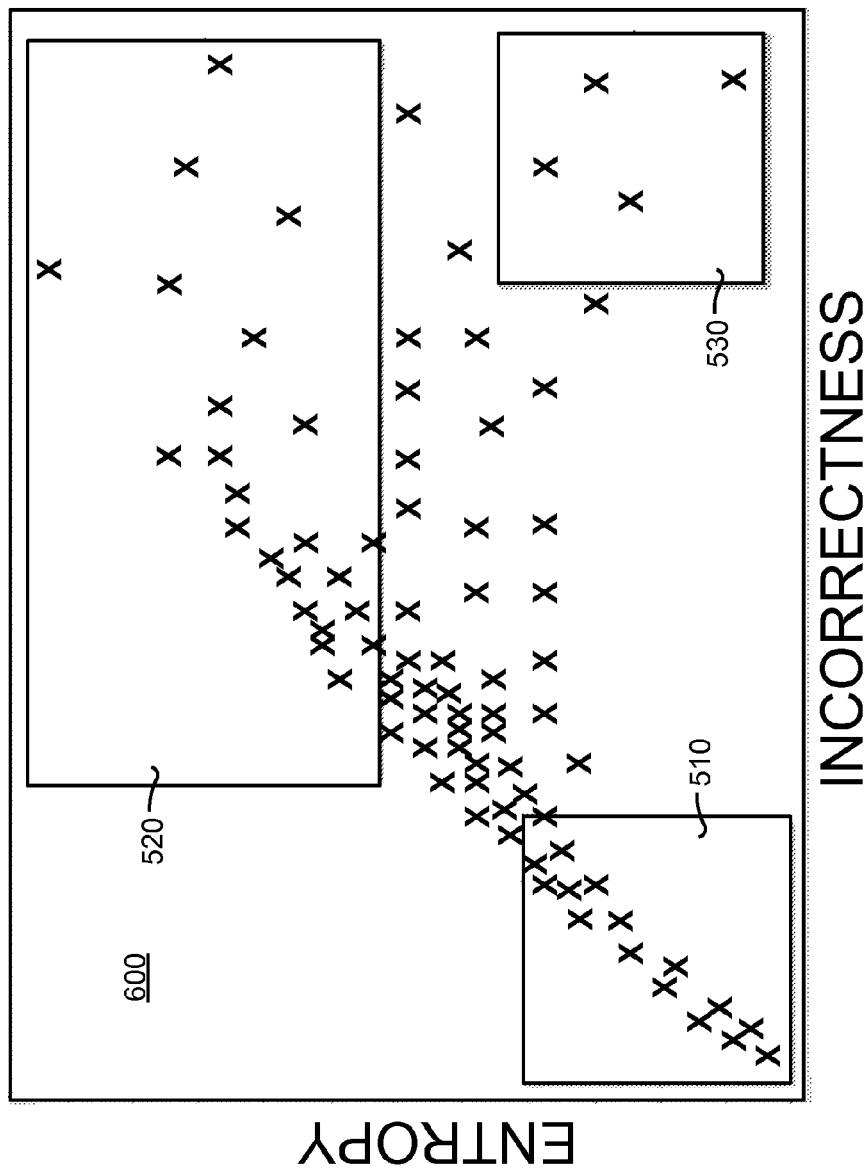
FIG. 6 illustrates an exemplary example of the incorrectness versus entropy graph shown in FIG. 5.

FIG. 6 illustrates an exemplary example of the incorrectness versus entropy graph shown in FIG. 5. In particular, FIG. 6 illustrates a graph 600 plotting incorrectness versus entropy using a plurality of data points. It can be seen from FIG. 6 that some of the data falls with in the canonical area 510, some data falls within the unsure area 520, and some data falls within the confused area 530. The user is able to obtain information from the graph 600 based on where the data falls on the graph 600.

III.B.2.i. Label Noise Module

Figure 7:
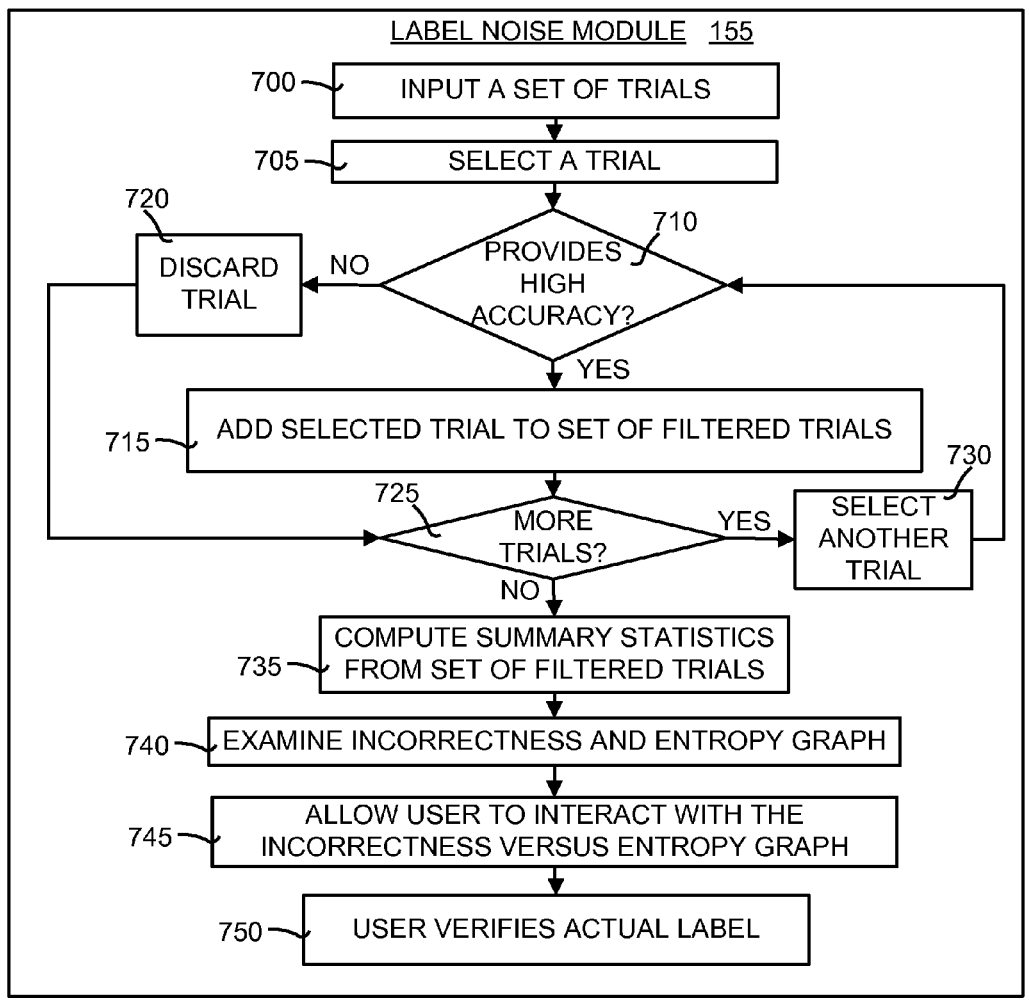
FIG. 7 is a flow diagram illustrating the operational details of embodiments of the label noise module shown in FIG. 1.

Embodiments of the incorrectness versus entropy module 150 include a label noise module 155. FIG. 7 is a flow diagram illustrating the operational details of embodiments of the label noise module shown in FIG. 1. In general, FIG. 7 illustrates the process used to find mislabeled examples. As shown in FIG. 7, the operation of embodiments of the module 155 begin by inputting a set of trials (box 700). Next, one of the trials from the set of trials is selected (box 705).

Embodiments of label noise module 155 filters trials to keep only configurations that provide high accuracy. This generates a set of filtered trials. In particular, referring to FIG. 7, a determination is made as whether the selected trial provides high accuracy (box 710). If so, then the selected trial is added to a set of filtered trials (box 715). If not, then the trial is discarded (box 720).

Next, a determination is made as to whether there are more trials in the set of trials (box 725). If so, then another trial is selected (box 730) and the process repeats from the determination as to whether the selected trial provides high accuracy (box 710). Otherwise, if there are no more trials, a set of summary statistics (like incorrectness and entropy) are computed from the set of filtered trials (box 735). This means that applying the filter changes the values of incorrectness and entropy. By removing low accuracy trials, embodiments of the label noise module 155 remove noise that might adversely affect statistics.

Embodiments of the label noise module 155 then allow a user to examine the incorrectness and entropy graph (box 740). Embodiments of the module 155 also allow the user to select the confused area of the graph by interacting with the scatter plot of incorrectness versus entropy (box 745). In some embodiments of the module 155, the user can "rubberband" over the region of interest to select and apply a filter to hone in on examples as the user desires. Users can inspect these examples and leverage their domain knowledge to verify the actual label (box 750). Embodiments of the module 155 provide a grid view that allows users to quickly view and verify inherently visual examples.

III.B.2.ii. Feature Attribution Module

Unsure examples are examples where the models do not agree on the predicted label. One reason for this is that the features are not descriptive enough for models to reliably differentiate between closely related classes. As a result, these examples may be able to help us understand the discriminative capabilities of existing features and leverage human knowledge to generate more discriminative features.

Figure 8:
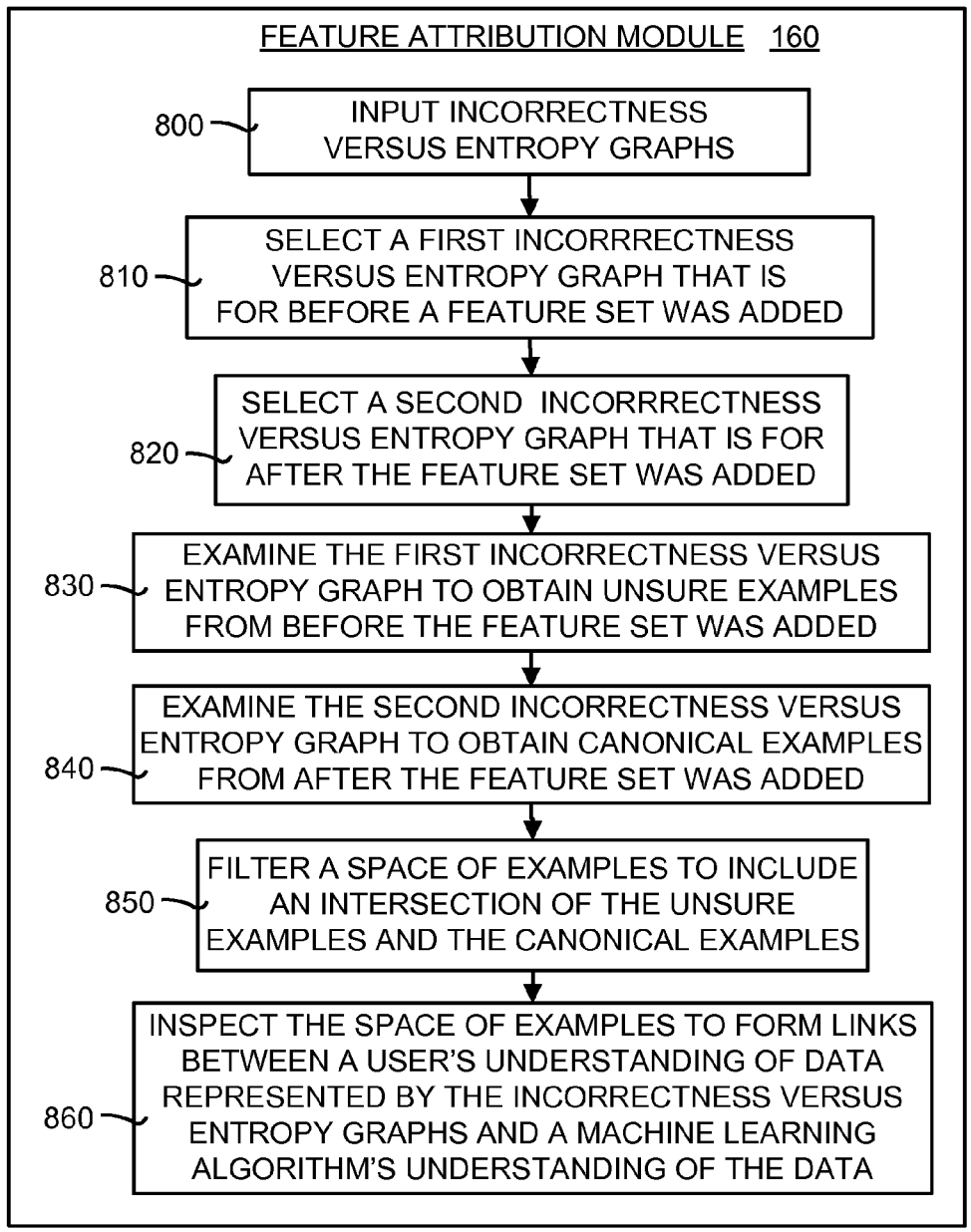
FIG. 8 is a flow diagram illustrating the operational details of embodiments of the feature attribution module shown in FIG. 1.

Embodiments of the incorrectness versus entropy module 150 include a feature attribution module 160. FIG. 8 is a flow diagram illustrating the operational details of embodiments of the feature attribution module 160 shown in FIG. 1. As shown in FIG. 8, the operation of embodiments of the feature attribution module 160 begin by inputting two incorrectness versus entropy graphs (box 800). A first of the graph is selected for before a feature set was added (box 810); and a second incorrectness versus entropy graph is selected that is for after the feature set was added (box 820).

Next, embodiments of the module 160 examine the first incorrectness versus entropy graph to obtain unsure examples from before the feature set was added (box 830). Moreover, the second incorrectness versus entropy graph is examined to obtain canonical examples from after the feature set was added (box 840). Embodiments of the module 160 then filter a space of examples to include an intersection of the unsure examples from before the feature set was added and the canonical examples from after the feature set was added (box 850). In effect this query says: "show me the examples that you were unsure about before the feature, but are confident about now." Finally, embodiments of the module 160 then inspect these examples to form links between a user's understanding of the data and the machine learning algorithm's understanding of the data (box 860).

III.B.3. Feature Generation Module

Figure 9:
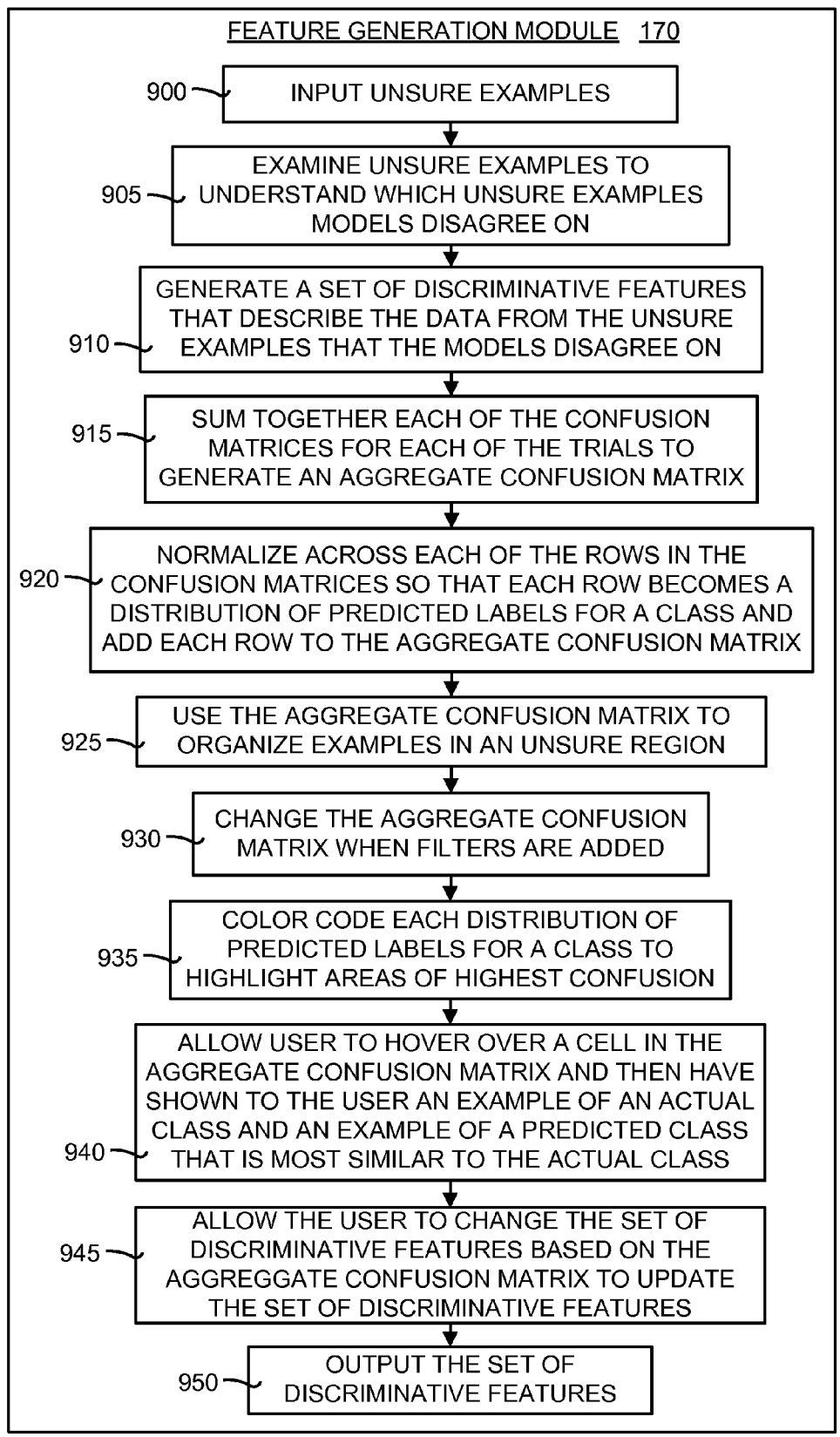
FIG. 9 is a flow diagram illustrating the operational details of embodiments of the feature generation module shown in FIG. 1.

Embodiments of the multiple model data exploration system 100 and method include a feature generation module 170. FIG. 9 is a flow diagram illustrating the operational details of embodiments of the feature generation module 170 shown in FIG. 1. The process begins by inputting the unsure examples that were obtained previously (box 900). These unsure examples than are examined to understand which examples the models disagree on (box 905). However, unlike feature attribution there is not a set of after features. Instead, the task is to use domain knowledge to generate a set of discriminative features that will describe the data more accurately. As shown in FIG. 9, a set of discriminative features is generated that describes the data from the unsure examples that the models disagree on (box 910).

Embodiments of the feature generation module 170 then sum together each of the confusion matrices for each of the trials to generate an aggregate confusion matrix (box 915). The aggregate confusion matrix helps organize the examples in the unsure region. This aggregate confusion matrix is a logical extension of a single confusion matrix to a set of many trials. Next, embodiments of the feature generation module 170 normalize across each of the rows (in other words, the actual label) in the confusion matrices so that each row becomes a distribution of predicted labels for a class (box 920). In addition, each row is added to the aggregate confusion matrix.

The aggregate confusion matrix then is used to organize examples in an unsure region (box 925). The aggregate confusion matrix changes when filters are added (box 930), as the process of filtering examples reduces the examples used to create the aggregate matrix and changes the distributions. The distributions of predicted labels in the unsure region may vary widely from the overall distribution. In some embodiments of the module 170 each distribution of predicted labels for a class is color coded in order to highlight areas of highest confusion (box 935).

In addition, embodiments of the module 170 allow a user to hover over a cell in the aggregate confusion matrix and then have the user be shown an example of the actual class and an example of the predicted class most similar to the actual class (box 940). In addition, embodiments of the module 170 allow the user to change the set of discriminative features based on the aggregate confusion matrix to update the set of discriminative features (box 945). In this manner, users can leverage their domain knowledge to compare examples, find differences, and encode those differences as discriminative features. Embodiments of the module 170 then output the set of discriminative features (box 950).

IV. Exemplary Operating Environment

Embodiments of the multiple model data exploration system 100 and method are designed to operate in a computing environment. The following discussion is intended to provide a brief, general description of a suitable computing environment in which embodiments of the multiple model data exploration system 100 and method may be implemented.

Figure 10:
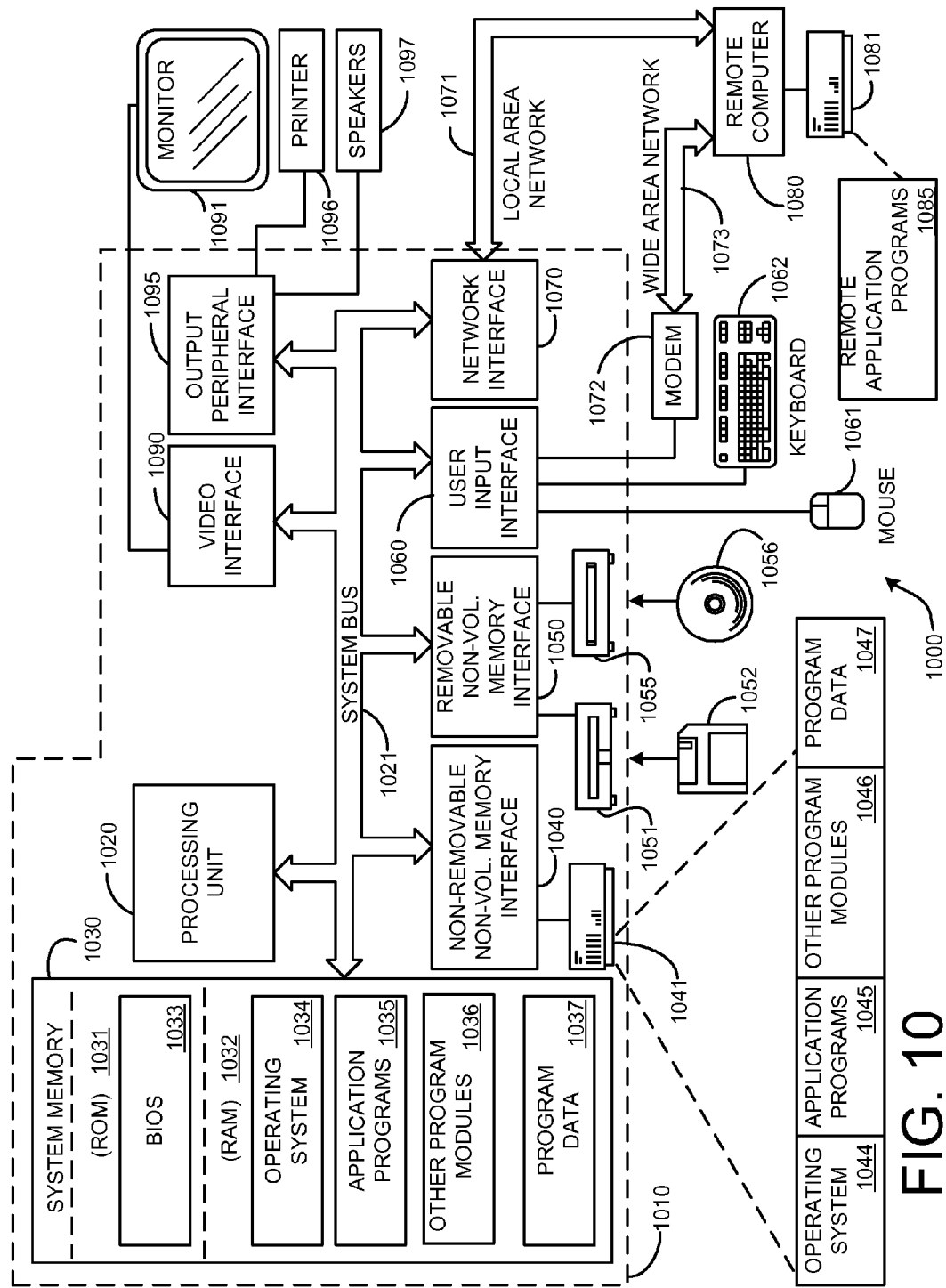
FIG. 10 illustrates an example of a suitable computing system environment in which embodiments of the multiple model data exploration system and method shown in FIGS. 1-9 may be implemented.

FIG. 10 illustrates an example of a suitable computing system environment in which embodiments of the multiple model data exploration system 100 and method shown in FIGS. 1-9 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment.

Embodiments of the multiple model data exploration system 100 and method are operational with numerous other general purpose or special purpose computing system environments or configurations. Examples of well known computing systems, environments, and/or configurations that may be suitable for use with embodiments of the multiple model data exploration system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the multiple model data exploration system 100 and method may be described in the general context of computer-executable instructions, such as program modules, being executed by a computer. Generally, program modules include routines, programs, objects, components, data structures, etc., that perform particular tasks or implement particular abstract data types. Embodiments of the multiple model data exploration system 100 and method may also be practiced in distributed computing environments where tasks are performed by remote processing devices that are linked through a communications network. In a distributed computing environment, program modules may be located in both local and remote computer storage media including memory storage devices. With reference to FIG. 9, an exemplary system for embodiments of the multiple model data exploration system 100 and method includes a general-purpose computing device in the form of a computer 1010.

Components of the computer 1010 may include, but are not limited to, a processing unit 1020 (such as a central processing unit, CPU), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer readable media. Computer readable media can be any available media that can be accessed by the computer 1010 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1010. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within the computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM; solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information (or data) into the computer 1010 through input devices such as a keyboard 1062, pointing device 1061, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1020 through a user input interface 1060 that is coupled to the system bus 1021, but may be connected by other interface and bus structures, such as, for example, a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method comprising:
using a general-purpose computing device to perform the following:
obtaining a dataset containing labeled data;
generating multiple models from the dataset so that the multiple models are based on different configurations of the dataset;
running different classifier training and evaluation experiments using the multiple models and the different configurations of the dataset to obtain results of the different classifier training and evaluation experiments; and
providing output based on the results of running the different classifier training and evaluation experiments.

2. The method of claim 1, further comprising systematically varying the multiple models and associated parameters during generation of the multiple models to obtain the results as a set that matches constraints set by a user.

3. The method of claim 1, further comprising:
generating a different set of predicted labels for each of the multiple models;
aggregating each set of predicted labels to obtain aggregated predicted labels;
computing summary statistics for the aggregated predicted labels; and
characterizing data examples from the dataset as first data examples that tend to be confused by the multiple models and second data examples that tend to be mislabeled by the multiple models.

4. The method of claim 3, further comprising:
providing the output as a visualization of the summary statistics;
receiving user inputs interacting with the visualization of the summary statistics; and
updating the visualization in response to the user inputs.

5. The method of claim 1, further comprising:
obtaining an initial set of tuples from the labeled data, where the initial set of tuples correspond to labels for the labeled data;
generating a set of trials from the initial set of tuples; and
executing each trial in the set of trials.

6. The method of claim 5, further comprising:
computing summary statistics for sets of examples, trials, and sets of trials;
computing a percentage of correctly-classified tuples to determine accuracies for each of the multiple models;
comparing accuracies across the multiple models; and
computing label entropy.

7. The method of claim 5, further comprising:
selecting a trial from the set of trials;
determining whether the selected trial provides high accuracy;
when the selected trial does not provide high accuracy, then discarding the selected trial;
when the selected trial does provide high accuracy, then adding the selected trial to a set of filtered trials; and
computing summary statistics from the set of filtered trials.

8. The method of claim 7, further comprising:
providing the output as an incorrectness and entropy graph;

receiving user inputs to the incorrectness and entropy graph; and receiving a user verification of an actual label of an individual data example from the dataset shown in the incorrectness and entropy graph.

9. A computing device comprising:

a processing unit; and one or more computer storage media storing computer readable instructions which, when executed by the processing unit, configure the processing unit to:

generate multiple models from a dataset containing labeled data having associated labels;

generate a set of trials from an initial set of tuples, the initial set of tuples corresponding to the labels for the labeled data;

execute the trials in the set of trials;

generate a new set of tuples from the executed trials, the new set of tuples corresponding to predicted labels;

aggregate sets of the predicted labels to obtain aggregated predicted labels;

compute summary statistics for the aggregated predicted labels; and create a visualization of the summary statistics, wherein the visualization comprises at least one incorrectness versus entropy graph.

10. The computing device of claim 9, wherein the computer readable instructions further configure the processing unit to:

compute a percentage of correctly classified tuples using the aggregated predicted labels and actual labels of the labeled data to determine accuracies of the multiple models.

11. The computing device of claim 10, wherein the computer readable instructions further configure the processing unit to:

compute incorrectness from the accuracies of the multiple models;

compute label entropy; and generate the at least one incorrectness versus entropy graph using the incorrectness and the label entropy.

12. The computing device of claim 11, wherein the computer readable instructions further configure the processing unit to:

select a trial from the set of trials to obtain a selected trial;

determine that the selected trial provides high accuracy;

add the selected trial to a set of filtered trials; and compute the summary statistics from the set of filtered trials.

13. The computing device of claim 12, wherein the computer readable instructions further configure the processing unit to:

receive a user input selecting a region of interest from the at least one incorrectness versus entropy graph, and filter data examples from the dataset that fall within the region of interest.

14. The computing device of claim 9, wherein the computer readable instructions further configure the processing unit to:

create a first incorrectness versus entropy graph representing incorrectness versus entropy of the multiple models before a feature set was added for use by the multiple models; and create a second incorrectness versus entropy graph representing incorrectness versus entropy of the multiple models after the feature set was added.

15. The computing device of claim 9, wherein the computer readable instructions further configure the processing unit to:

filter a space of examples from the dataset to obtain an intersection of unsure examples from the dataset and canonical examples from the dataset.

16. One or more computer-readable memory devices or storage devices storing instructions which, when executed by a processing unit of a computing device, cause the processing unit to perform acts comprising:

obtaining an initial set of tuples from labeled data such that the tuples correspond to actual labels for the labeled data;

generating a set of trials from the initial set of tuples;

executing the trials in the set of trials to run different classifier training and evaluation experiments using multiple models;

generating a new set of tuples from the executed trials that correspond to predicted labels such that different sets of predicted labels are generated by the multiple models;

aggregating the different sets of predicted labels to obtain an aggregated set of predicted labels;

computing summary statistics for the different sets of predicted labels and the actual labels for the labeled data; and generating a visualization of the summary statistics.

17. The one or more computer-readable memory devices or storage devices of claim 16, wherein the visualization comprises at least one incorrectness versus entropy graph.

18. The one or more computer-readable memory devices or storage devices of claim 16, the acts further comprising:

summing together confusion matrices for each trial in the set of trials to generate an aggregate confusion matrix;

normalizing across each row in the confusion matrices so that each row becomes a distribution of predicted labels for a class; and adding each row to the aggregate confusion matrix.

19. The one or more computer-readable memory devices or storage devices of claim 18, the acts further comprising:

using the aggregate confusion matrix to organize examples in an unsure region;

changing the aggregate confusion matrix whenever filters are added; and color coding each distribution of predicted labels to highlight areas of highest confusion.

20. The one or more computer-readable memory devices or storage devices of claim 18, the acts further comprising:

receiving user input hovering over a cell in the aggregate confusion matrix;

presenting to the user an example of an actual class and an example of a predicted class that is most similar to the actual class; and updating a set of discriminative features based on further user input identifying a change to the set of discriminative features to arrive at an optimal or at least partly optimized model.

* * * * *